(12) United States Patent
Sun et al.

(10) Patent No.: US 9,276,420 B2
(45) Date of Patent: Mar. 1, 2016

(54) BATTERY POWER SYSTEM HAVING HIGH WORKING STABILITY

(71) Applicant: UER Technology Corporation, Miaoli (TW)

(72) Inventors: Ray-Tang Sun, Miaoli (TW); Tsung-Hsien Chuang, Miaoli (TW); Nien-Tien Cheng, Miaoli (TW); Chien-Lung Chen, Miaoli (TW)

(73) Assignee: UER Technology Corporation, Miaoli County (TW)

( * ) Notice: Subject to any disclaimer, the term of this patent is extended or adjusted under 35 U.S.C. 154(b) by 193 days.

(21) Appl. No.: 14/067,979

(22) Filed: Oct. 31, 2013

(65) Prior Publication Data

US 2015/0084594 A1 Mar. 26, 2015

(30) Foreign Application Priority Data

Sep. 25, 2013 (TW) .............................. 102134510 A

(51) Int. Cl.
*H02J 7/00* (2006.01)
*H01M 10/42* (2006.01)
*H01M 2/10* (2006.01)
*H01M 10/052* (2010.01)
*H01M 10/653* (2014.01)
*H01M 10/6567* (2014.01)
*H01M 10/643* (2014.01)

(52) U.S. Cl.
CPC ........... *H02J 7/0029* (2013.01); *H01M 10/425* (2013.01); *H01M 10/4207* (2013.01); *H02J 7/0042* (2013.01); *H02J 7/0068* (2013.01); *H01M 2/1016* (2013.01); *H01M 10/052* (2013.01); *H01M 10/643* (2015.04); *H01M 10/653* (2015.04); *H01M 10/6567* (2015.04)

(58) Field of Classification Search
CPC ..... H02J 7/0029; H02J 7/0042; H02J 7/0068; H01M 10/4207; H01M 10/425; H01M 2/1016; H01M 10/643; H01M 10/653; H01M 10/6567; H01M 10/052
See application file for complete search history.

(56) References Cited

U.S. PATENT DOCUMENTS

| | | | | |
|---|---|---|---|---|
| 5,015,545 | A * | 5/1991 | Brooks | 429/99 |
| 6,818,343 | B1 * | 11/2004 | Kimoto et al. | 429/99 |
| 7,746,034 | B2 * | 6/2010 | Lee et al. | 320/150 |
| 7,772,799 | B2 * | 8/2010 | Wu | 320/104 |
| 2003/0077507 | A1 * | 4/2003 | Hoh | 429/120 |
| 2008/0259569 | A1 * | 10/2008 | Lin | 361/704 |
| 2011/0223458 | A1 | 9/2011 | Ferber, Jr. | |
| 2012/0021260 | A1 * | 1/2012 | Yasui et al. | 429/53 |
| 2013/0149582 | A1 | 6/2013 | Kimura et al. | |
| 2013/0196196 | A1 * | 8/2013 | Obeidi et al. | 429/82 |
| 2013/0320918 | A1 * | 12/2013 | Ohmer et al. | 320/107 |
| 2014/0015455 | A1 * | 1/2014 | Yonehana | 318/139 |
| 2014/0141288 | A1 * | 5/2014 | Kim et al. | 429/7 |

\* cited by examiner

*Primary Examiner* — Naum B Levin
(74) *Attorney, Agent, or Firm* — Novak Druce Connolly Bove + Quigg LLP

(57) ABSTRACT

A battery power system includes a number of battery modules. Each battery module includes a number of battery cells, a management circuit positioned at a first side of the battery module, and a heat source positioned at a second side of the battery module and opposite to the first side. The management circuit is electrically connected to and manages charging and discharging of the cells of the corresponding battery module. The heat source is thermally coupled to the cells of the corresponding battery module and dissipates heat generated by the cells of the corresponding battery module. The battery modules are arranged in two lines, and the first sides of the battery modules in one line are positioned adjacent to and face the first sides of the battery modules in another line.

16 Claims, 2 Drawing Sheets

BATTERY POWER SYSTEM HAVING HIGH WORKING STABILITY

BACKGROUND

1. Technical Field

The present disclosure relates to batteries, and particularly to a battery power system capable of working stably.

2. Description of Related Art

Battery power system often includes a number of battery modules, each of which includes a number of battery cells. Each module also includes a management circuit electrically connected to and thus managing discharging and charging of each cell in the module. When working, the cells generate heat. As such, each module also includes a heat dissipation device for dissipating the heat. The management circuit and the heat dissipation device should be reasonably arranged. Otherwise, the management circuit may be adversely affected by the heat and becomes unstable.

Therefore, it is desirable to provide a battery power system that can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
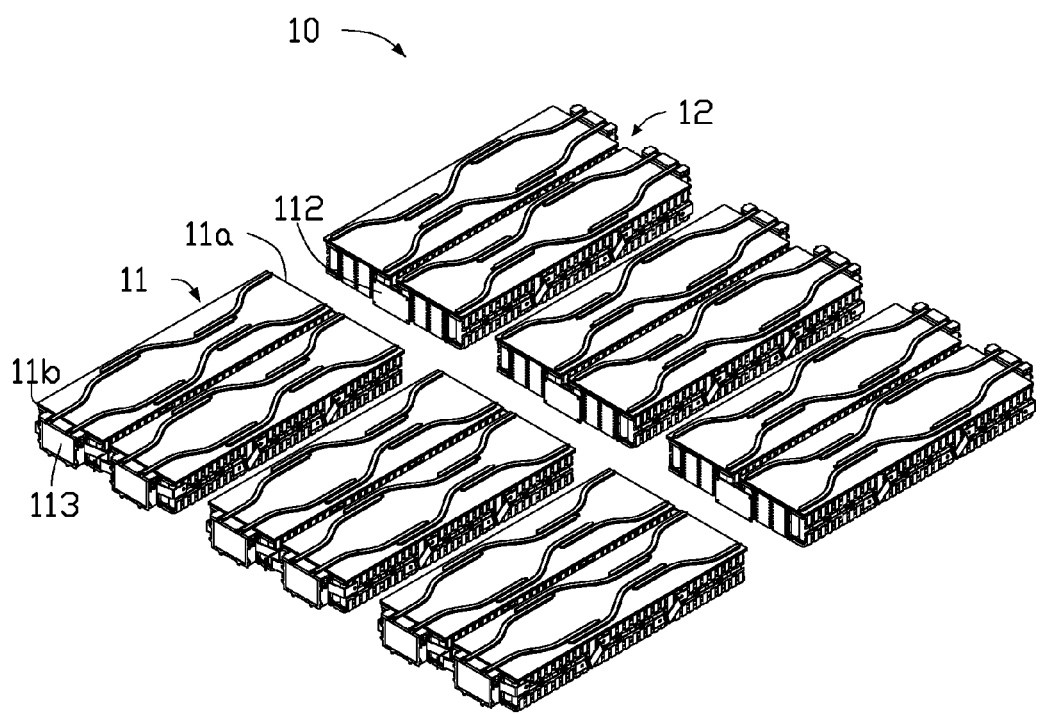
FIG. 1 is an isometric, schematic view of a battery power system in accordance with an embodiment.
Figure 2:
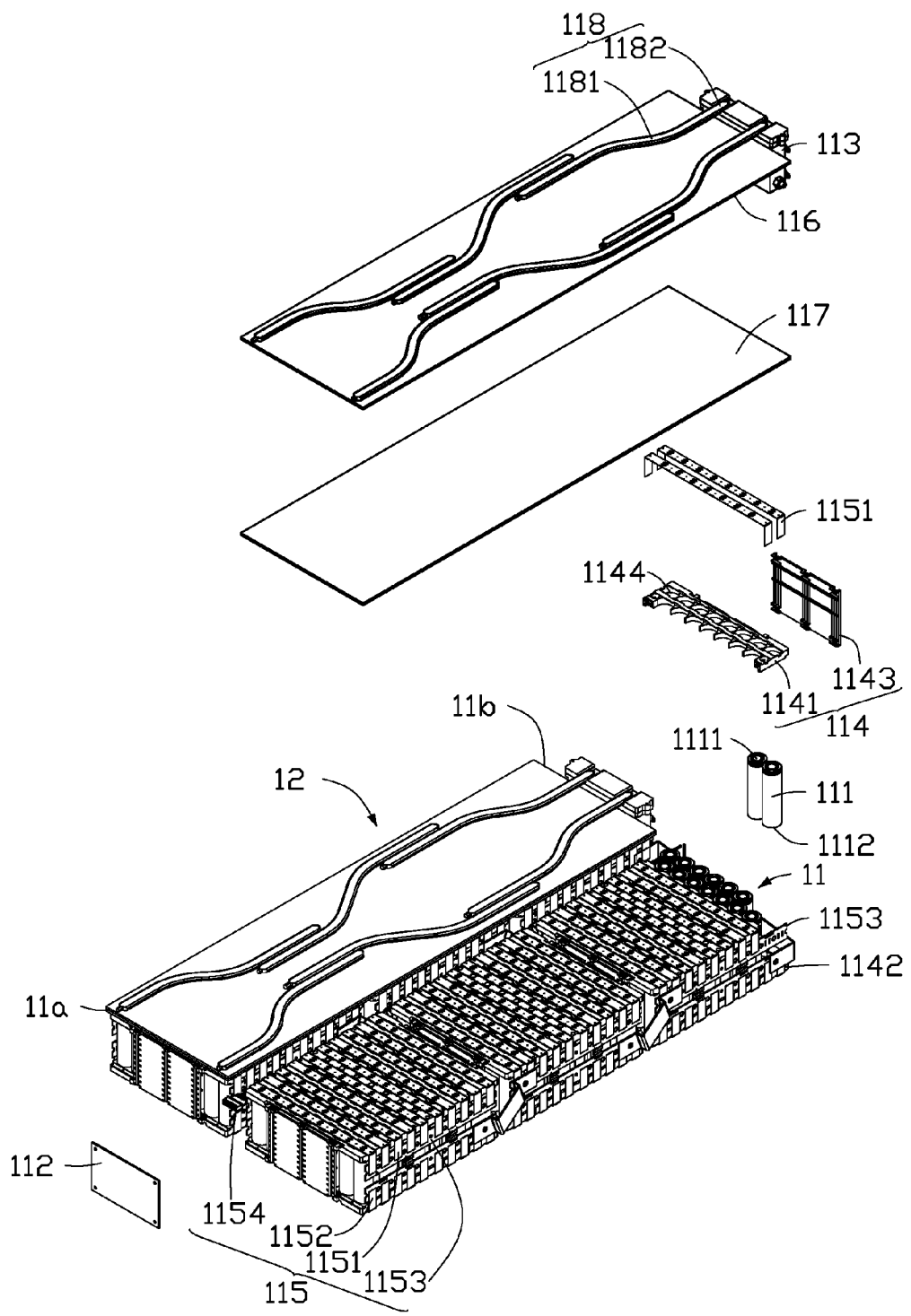
FIG. 2 is an exploded view of a battery sub-system of the system of FIG. 1.

FIGS. 1-2 show a battery power system 10, according to an embodiment. The system 10 includes a number of battery modules 11. Each module 11 includes a number of battery cells 111, a management circuit 112 positioned at a first side 11a of the module 11, and a heat source 13 positioned at a second side 11b of the module 12 opposite to the first side 11a. The management circuit 112 is electrically connected to and manages charging and discharging of the cells 111 of the corresponding module 11. The heat source 113 is thermally coupled to and dissipates heat generated by the cells 111 of the corresponding module 11. The modules 11 are arranged in two lines, and the first sides 11a of the modules 11 in one line are positioned adjacent to and face the first sides 11a of the modules 11 in another line.

As such, in each module 11, the management circuit 112 and the heat source 113 are oppositely positioned, that is, the management circuit 112 is positioned away from the heat source 113 as far as possible in the module 11. In the whole system 10, all the heat sources 113 are positioned at two opposite outer sides of the system 10 to facilitate heat dissipation of the whole power system 10 and all the management circuits 112 are positioned at a central portion of the system 11, that is, the management circuits 112 are positioned away from the heat sources 113 as far as possible in the system 10. Thus, the management circuits 112 can avoid being adversely affected by the heat generated by the cells 111 and flowing to the heat sources 113 and thus can keep working with a high stability.

In this embodiment, the number of the modules 11 is twelve and each line includes six modules 11. In each line, each two adjacent modules 11 are integrated together as a battery sub-system 12. To reduce size and cost, the management circuits 112 in the same sub-system 12 can be integrated into one printed circuit board positioned between the modules 11 of the sub-system 12. Heat dissipation channels (i.e., spaces) are formed between each two adjacent sub-systems 12 in the same line or in different lines to increase heat dissipation efficiency.

The number and arrangement of the modules 11 are not limited to this embodiment and can be changed according to needs.

Each cell 111 can be a lithium rechargeable battery and is cylindrical in shape. Each cell 111 includes a positive electrode 1111 and a negative electrode 1112 respectively positioned at two opposite ends of the cell 111. The cells 111 in the same module 11 are arranged in parallel with each other and in a matrix. As such, each module 11 has a substantially cubic outer contour/profile.

The management circuit 112 is also used to monitor working parameters, such as a total capacity, a residual capacity, and a temperature, of each cell 111 in the corresponding module 11.

The heat source 113 is a substantially rectangular chamber containing coolant liquid (not shown) therein.

Each module 11 includes a holder 114 for holding the cells 111. In this embodiment, the holder 114 is substantially cubic and includes an upper plate 1141, a lower plate 1142, and two side plates 1143. Each of the upper plate 1141 and the lower plate 1142 defines a number of holding holes 1144 corresponding to the cells 111 in shape and position. The end of each cell 111 having the positive electrode 1111 is inserted into and held in one of the holding holes 1144 of the upper plate 1141. The other end of each cell 111 having the negative electrode 1112 is inserted into and held in one of the holding holes 1144 of the lower plate 1142. The side plates 1143 are positioned at the first side 11a and the second side 11b of the corresponding module 11 and engage with the upper plate 1141 and the lower plate 1142, thus locking the upper plate 1141 and the lower plate 1142 to together.

The holder 114 can be made of an electrical isolative material of high conductivity, such a heat conductive plastic. As such, abnormal heat generated by any abnormal cell 111 can be efficiently distributed out, rather than accumulated and causing damages.

Of course, the holder 14 is not limited to this embodiment and can be changed depending on need.

Each module 11 also includes a conductive frame 115 for electrically connecting the cells 111 to the management circuit 112 in the module 11. In this embodiment, the conductive frame 115 includes a number of first stripes 1151, a number of second stripes 1152, a number of third stripes 1153, and a connector 1154. The first stripes 1151 cover and contact the positive electrodes 1111 of the cells 111, the second stripes 1152 cover and contact the negative electrodes 1112 of the cells 11, and the third stripes 1153 interconnect the first stripes 1151, the second stripes 1152, and the connector 1154 in a desired manner to realize desired connections and functions. The connector 1154 is positioned at the first side 11a and connects with the management circuit 112. Thus, the cells 111 are connected to the management circuit 112.

As in this embodiment the modules 11 in the same subsystem 12 share one printed circuit board, the connectors 1154 in the same sub-system 12 also can be integrated into one piece and positioned between the modules 11 of the sub-system 12 to engage with the printed circuit board.

The first stripes 1151, the second stripes 1152, and the third stripes 1153 can be made of copper.

The conductive frame 15 is not limited to this embodiment but can be changed in other embodiments depending on need.

To efficiently conduct the heat from the cells 111 to the heat source 113, each module 11 also includes a heat conductive panel 116 and an adhesive layer 117 adhering the heat conductive panel 116 to the positive electrodes 1111 of the module 11. The conductive panel 116 is made of a metal of a high thermal conductivity, such as aluminum. The adhesive layer 17 is made of an electrically isolative and thermally conductive adhesive, such as silicon gel.

Each module 11 also includes a set of heat pipes 118 positioned on the heat conductive panel 16. In this embodiment, the set of heat pipes 118 includes two heat pipes 118, each of which communicates with the corresponding heat source 113 and extends from heat source to the corresponding first side 11a. Each heat pipe 118 includes a vapor section 1181 positioned on and thermally coupled with the heat conductive panel 116 and a cool section 1182 positioned on and communicating with the heat source 1182.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. A battery power system, comprising a plurality of battery modules, each battery module comprising:
    a plurality of battery cells, each of the plurality of battery cell comprising a positive electrode and a negative electrode respectively positioned at two opposite ends of the battery cell;
    a management circuit positioned at a first side of the battery module; and
    a heat source positioned at a second side of the battery module and opposite to the first side;
        wherein the management circuit is electrically connected to and manages charging and discharging of the battery cells of each battery module, the heat source is thermally coupled to the battery cells and dissipates heat generated by the battery cells, the battery modules are arranged in two lines, and the first sides of the battery modules in one line are positioned adjacent to and face the first sides of the battery modules in another line; the battery cells in the same battery module are arranged in parallel with each other and in a matrix; each battery module also comprises a conductive frame electrically connecting the battery cells to the management circuit in the same battery module, the conductive frame comprises a number of first stripes, a number of second stripes, a number of third stripes, and a connector, the first stripes cover and contact the positive electrodes of the battery cells, the second stripes cover and contact the negative electrodes of the battery cells, and the third stripes interconnect the first stripes, the second stripes, and the connector in a desired manner to realize desired connections and functions, the connector is positioned at the first side and connects with the management circuit.

2. The battery power system of claim 1, wherein, in each line, each two adjacent battery modules are integrated together as a battery sub-system, the management circuits in the same sub-system are integrated into one printed circuit board positioned between the battery modules of the same sub-system.

3. The battery power system of claim 2, wherein heat dissipation channels are formed between each two adjacent sub-systems in the same line or in different lines to increase heat dissipation efficiency.

4. The battery power system of claim 1, wherein each battery cell is a lithium rechargeable battery and is cylindrical in shape.

5. The battery power system of claim 1, wherein each battery module comprises a holder holding the battery cells, the holder is substantially cubic and comprises an upper plate, a lower plate, and two side plates, each of the upper plate and the lower plate defines a plurality of holding holes corresponding to the battery cells in shape and position, the end of each battery cell having the positive electrode is inserted into and held in one of the holding holes of the upper plate, the other end of each battery cell having the negative electrode is inserted into and held in one of the holding holes of the lower plate, the side plates are positioned at the first side and the second side of the corresponding battery module and engage with the upper plate and the lower plate, thus locking the upper plate and the lower plate together.

6. The battery power system of claim 5, wherein the holder is made of an electrical isolative material of high conductivity.

7. The battery power system of claim 5, wherein the holder is made of a heat conductive plastic.

8. The battery power system of claim 1, wherein the connectors in the same sub-system are one piece and positioned between the battery modules of the same sub-system to engage with the printed circuit board.

9. The battery power system of claim 1, wherein the first stripes, the second stripes, and the third stripes are made of copper.

10. The battery power system of claim 1, wherein each battery module also comprises a heat conductive panel and an adhesive layer adhering the heat conductive panel to the positive electrodes of the battery module.

11. The battery power system of claim 10, wherein the heat conductive panel is made of a metal of a high thermal conductivity.

12. The battery power system of claim 10, wherein the heat conductive panel is made of aluminum.

13. The battery power system of claim 10, wherein the adhesive layer is made of an electrically isolative and thermally conductive adhesive.

14. The battery power system of claim 10, wherein the adhesive layer is made of silicon gel.

15. The battery power system of claim 10, wherein each battery module also comprises a set of heat pipes positioned on the heat conductive panel, each heat pipe communicates with the corresponding heat source and extends from the corresponding heat source to the corresponding first side, each heat pipe comprises a vapor section positioned on and thermally coupled with the heat conductive panel and a cool section positioned on and communicating with the corresponding heat source.

16. A battery power system, comprising a plurality of battery modules, each battery module comprising:
    a plurality of battery cells;
    a management circuit positioned at a first side of the battery module; and
    a heat source positioned at a second side of the battery module and opposite to the first side;

wherein the management circuit is electrically connected to and manages charging and discharging of the battery cells of each battery module, the heat source is thermally coupled to the battery cells and dissipates heat generated by the battery cells, the battery modules are arranged in two lines, and the first sides of the battery modules in one line are positioned adjacent to and face the first sides of the battery modules in another line, and the first sides of the battery modules in the two lines are positioned between the second sides of the battery modules in one line and the second sides of the battery modules in another line.

* * * * *